United States Patent
Butterfield

[19]

[11] Patent Number: 6,123,638

[45] Date of Patent: Sep. 26, 2000

[54] THREE-WAY PHASED CONTINUOUSLY VARIABLE TRANSMISSION CHAIN WITH STRUT RETENTION

[75] Inventor: Roger P. Butterfield, Trumansburg, N.Y.

[73] Assignee: BorgWarner Inc., Troy, Mich.

[21] Appl. No.: 09/232,389

[22] Filed: Jan. 15, 1999

Related U.S. Application Data

[60] Provisional application No. 60/079,260, Mar. 25, 1998.

[51] Int. Cl.⁷ .................................. F16G 1/21; F16G 7/00
[52] U.S. Cl. ............................................. 474/245; 475/85
[58] Field of Search ................................. 474/245, 240, 474/242, 243, 244, 206, 84, 85, 241, 201

[56] References Cited

U.S. PATENT DOCUMENTS

| | | |
|---|---|---|
| 4,507,106 | 3/1985 | Cole, Jr. ................................. 474/215 |
| 4,668,210 | 5/1987 | Honda ................................. 474/245 X |
| 4,776,829 | 10/1988 | Yamamuro et al. . |
| 4,813,918 | 3/1989 | Rattunde et al. . |
| 5,007,883 | 4/1991 | Cole, Jr. et al. ........................ 474/242 |
| 5,167,587 | 12/1992 | Mott ......................................... 474/245 |
| 5,318,485 | 6/1994 | Bateman ................................. 474/245 |
| 5,334,111 | 8/1994 | Cole, Jr. et al. .................... 474/245 X |
| 5,393,272 | 2/1995 | Okuwaki et al. ........................ 474/213 |
| 5,409,424 | 4/1995 | Okuwaki et al. ........................ 474/212 |
| 5,439,423 | 8/1995 | Okuwaki et al. ........................ 474/245 |
| 5,453,058 | 9/1995 | Reese et al. ............................. 474/206 |
| 5,645,502 | 7/1997 | Wakabayashi et al. .................... 474/85 |

OTHER PUBLICATIONS

European Search Report for Application No. EP 99301504.9 dated Jul. 7, 1999.

*Primary Examiner*—David A. Bucci
*Assistant Examiner*—Marcus Charles
*Attorney, Agent, or Firm*—Sidley & Austin; Greg Dziegielewski

[57] ABSTRACT

A continuously variable transmission (CVT) chain has three chain portions, or chain assemblies, that are phased or off-set by one-half pitch length with respect to each other. Struts that contact the pulleys of the CVT have upper portions that extend through passageways formed by depending toes in the inner links. The upward portions of the struts are provided at portions that correspond to the offset portions of the chain.

6 Claims, 5 Drawing Sheets

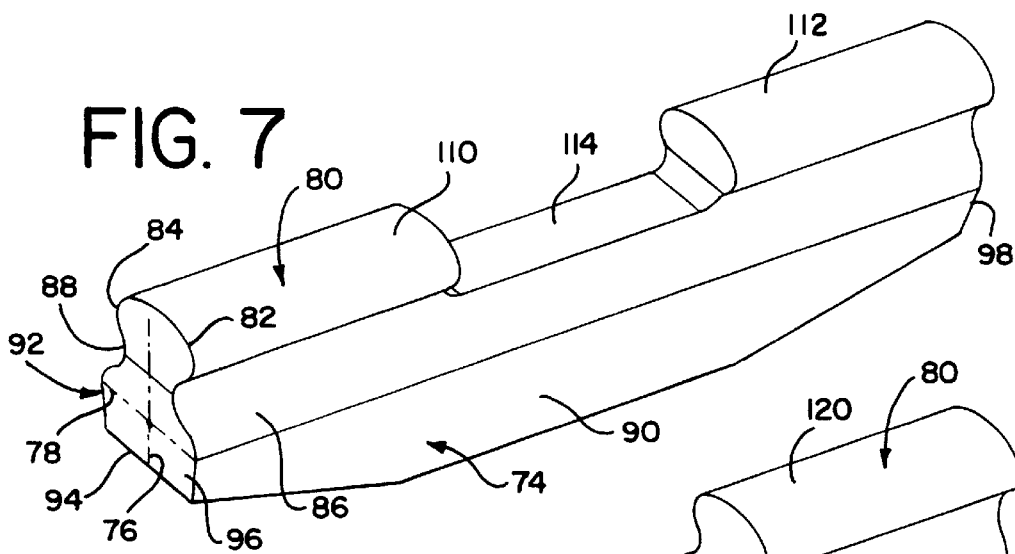
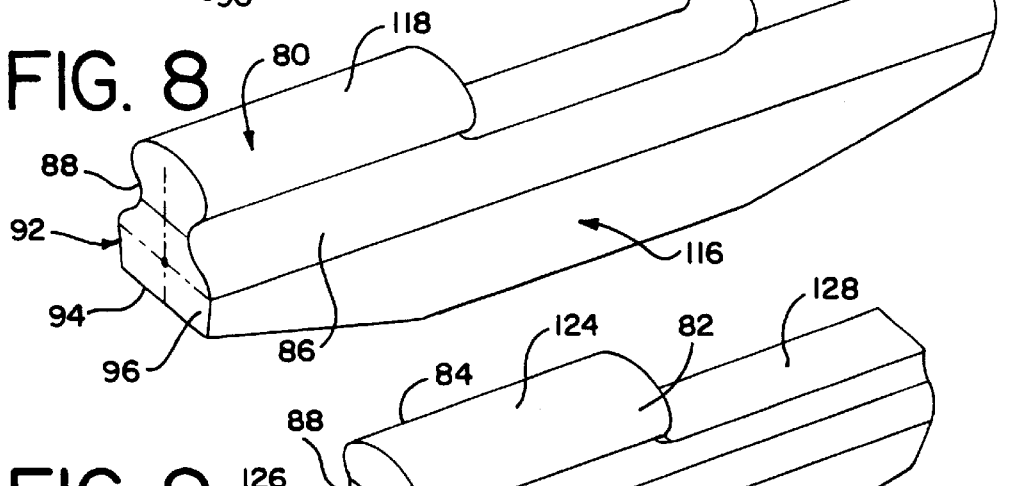
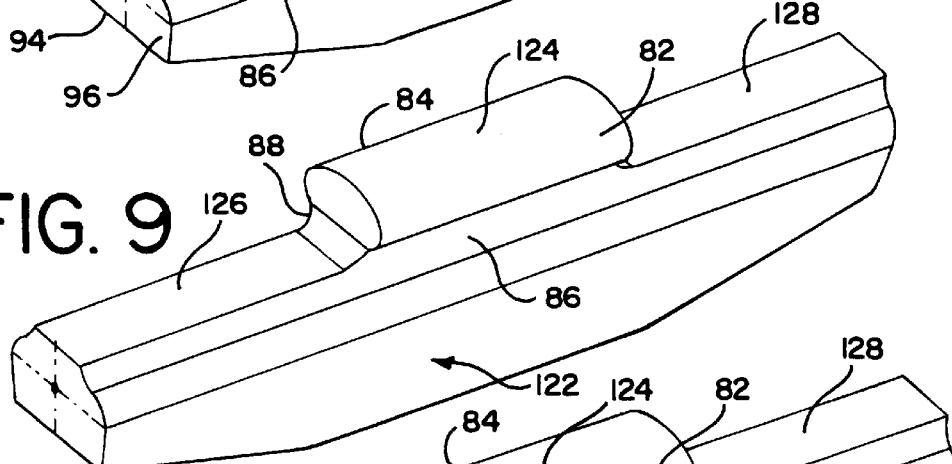
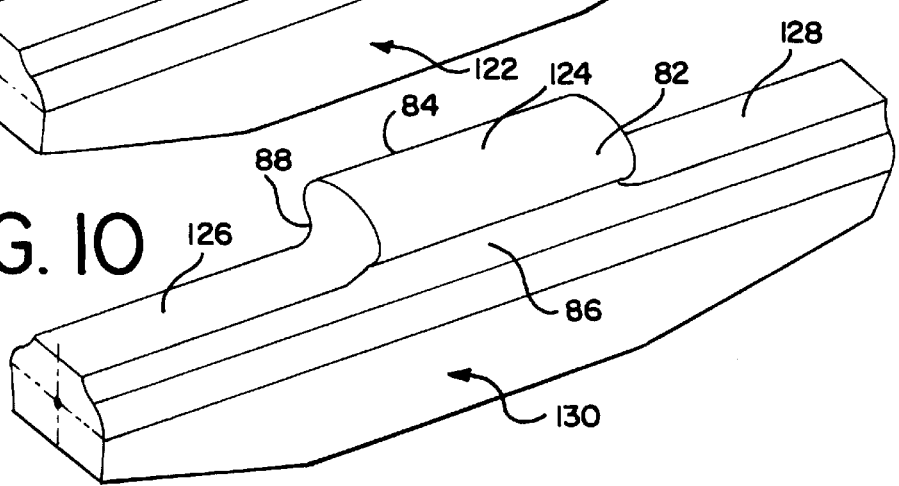

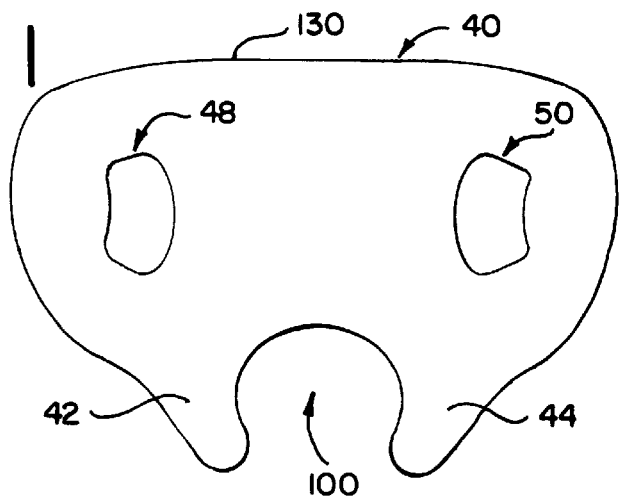
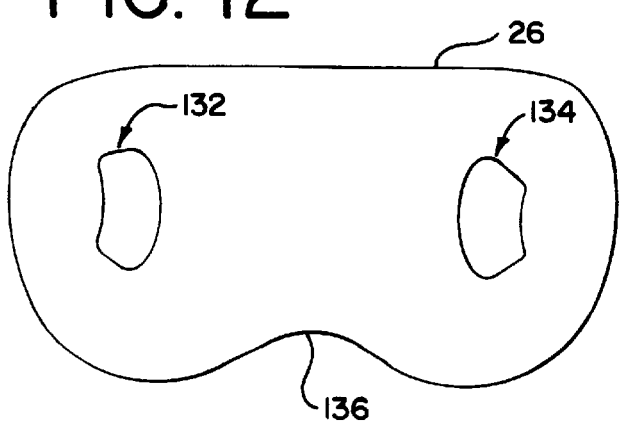
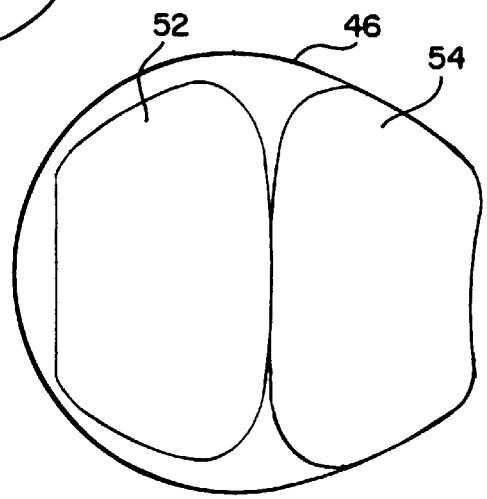
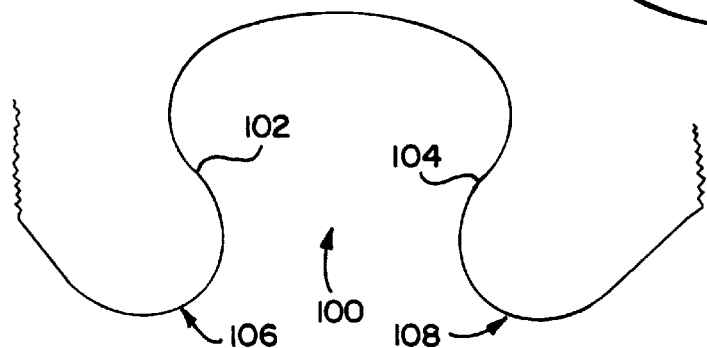

6,123,638

THREE-WAY PHASED CONTINUOUSLY VARIABLE TRANSMISSION CHAIN WITH STRUT RETENTION

This application claims the benefit of U.S. Provisional Application Serial No. 60/079,260, filed Mar. 25, 1998.

BACKGROUND OF THE INVENTION

This invention relates to a power transmission chain belt and, in particular, to a power transmission chain belt for use with a continuously variable transmission (CVT). The belt is comprised of a large number of interleaved link plates which are placed parallel to the chain rotational direction and carry a number of load blocks or struts for transmission of power to the variable width pulleys of the CVT. The belt is formed of a plurality of adjacent chain portions that are offset or phased by a portion of one chain pitch. Preferably, the belt is formed of at least three adjacent chain portions that are offset or phased by one-half pitch.

An example of a power transmission chain belt for a CVT is shown in FIG. 15 of the drawings. As shown in that figure, the CVT includes input shaft 101a and output shaft 102a, which carry primary (drive) and secondary (driven) pulleys 103a, 104a, respectively. The chain belt 105a interconnects the primary and secondary pulleys of the CVT.

Primary pulley 103a includes fixed pulley portion 103a', which is fixed to input shaft 101a, and moveable pulley 103b', which is moveable along input shaft 101a. Similarly, secondary pulley 104a includes fixed pulley 104a', which is fixed to the output shaft 102a and moveable pulley 104b', which is moveable along the output shaft. The effective diameters of pulleys 103a and 104a are changed by movement of the moveable pulley portions 103b', 104b', which is caused by operation of hydraulic actuators, as is known in the art. In this manner the speed change ratio between the input and output shafts can be varied continuously.

An example of a two-way phased chain belt of the prior art is shown in FIG. 16 and includes two chains or chain portions 110a, 111a. The chain also includes load blocks or struts 112a, which are arranged in the direction of the length of the chain and extend across the width of the chain. The chains 110a, 111a are connected alternately by the struts passing between both chain widths. The pulleys contact the outside edges of the struts to pass power between the chain and the pulleys.

The chains are each comprised of link plates that are connected by connecting pins 106a, 107a. Protrusion 118a is formed at the connection of the chain to each strut to prevent displacement of the strut in the chain width direction (the left to right direction in FIG. 16).

Examples of phased transmission chains for CVTs are shown in U.S. Pat. Nos. 5,645,502 and 5,453,058, which are incorporated herein by reference. When these transmission chains are used, noise is generated as the load blocks or struts contact the sides of the pulleys. Efforts have been directed to decreasing the noise generated during such contact while maintaining a durable chain. Efforts at decreasing noise generation have involved, for example, using links of more than one pitch length, alternating the lengths of the struts, and changing the length of the windows of the links that receive the struts.

Other efforts at noise reduction in the prior art have included the use of two chain portions positioned in side-by-side relationship, but offset or phased by one-half pitch length. Other phased chains of the prior art have utilized three chain portions positioned in side-by-side relationship, but with the center portion offset from the two outside chain portions by a distance of one-half pitch length. The chain of the present invention is directed to this type of phased chain with three chain portions.

SUMMARY OF THE INVENTION

The present invention is directed to a chain for use in a variable pulley transmission. In one embodiment, the chain includes three chain portions or chains positioned in side-by-side relationship with one another. The center portion of the chain is offset from the two outside portions by a distance of one-half pitch length. The three chain portions, when positioned in side-by-side relationship, define the overall lateral or transverse width of the chain. Each chain portion includes inner links having a pair of spaced apart toes to define a passageway to receive a strut.

Struts of several different lengths may be used in the preferred embodiment of the chain of the present invention. Each strut has a length that may transverse the entire width of the chain. However, the struts differ in length and in the location of the upper support portions by which they are received and held within the toes of the links.

One type of strut, which is provided in two different lengths in the preferred embodiment, has an upwardly extending, rounded portion at its center that extends through the toes of the center chain or center chain portion. Extending laterally from the upwardly extending center portion are two flat or recessed portions. These flat portions preferably provide a small amount of clearance from the bodies of the links of the two outside portions of the chain. This type of strut is called an "inboard" strut.

A second type of strut, which is also provided in two different lengths in the preferred embodiment, has a flat or recessed portion in its center with a small amount of clearance from the bodies of the links of the center chain portion. Extending laterally from the recessed portion are a pair of upwardly extending, rounded portions that are received by the toes of each of the two outside portions of the chain. This type of strut is called an "outboard" strut.

The inboard and outboard struts are alternated along the length of the chain. The inboard and outboard struts each may have long and short versions of that type of strut. Long and short versions are utilized to impart a randomization or modification of the repetitive contacts of the struts with the sheaves to have an overall noise reduction effect.

When each portion of the chain and the associated struts are in side-by-side relation and interlaced, the struts are retained either by the center portion of the chain (inboard) or the outside portions of the chain (outboard), depending on where the upwardly extending portion of the strut is located and held by the toes of the links. In this way, a phased chain suitable for a CVT is assembled that utilizes the various portions of the chain to retain the struts across the entire transverse width of the chain.

The chain of the present invention utilizes three separate chain strands or portions that are individually assembled and then have struts inserted therein. With the outboard and inboard struts, the present invention provides a three-way phased CVT chain with fewer different components than some three-way phased chains of the prior art. Also, assembly of the chain portions before insertion of the struts provides certain advantages in manufacturing.

The struts of the present invention are moved closer to the pitch line than the struts of the prior art. Accordingly, less movement or torque bending is provided between the strut and the links, which improves the durability of the toes.

Moreover, the struts are positively retained by the chain strands instead of by grooves or protrusions that are often utilized in prior art chains.

In one embodiment of the invention, a chain for use in a variable pulley transmission comprises a first chain portion, a second chain portion and a third chain portion positioned in a side-by-side relationship and offset with respect to each other. The first chain portion is offset from the central or second chain portion by one-half pitch length. The central or second portion is offset from the third or other outside portion by one-half pitch length. The first and third chain portions, or outside chain portions are not offset from one another, but are separated in the transverse direction by the central portion.

Each chain portion comprises a plurality of interlaced rows of inner links. Each of the inner links has a pair of apertures that are transversely aligned and connected by a pair of pivot members or pins. Preferably the pins are pairs of rocker pins that rock or act against one another and permit rotation of the rows of inner links with respect to one another. Each inner link also has a pair of spaced apart, downwardly extending toes or teeth. The toes also define a continuous inner surface comprising two inner flanks and a crotch or connecting portion. The toes define a passageway to receive at least a portion of the strut. The toes hold an upwardly extending portion of the strut that passes between the toes.

At the outer ends of alternate rows of link are retaining or guide links. Each of the retaining links also has a pair of apertures. However, in contrast to the inner links, the retaining links have apertures that support only one of the pair of pivot pins that extend across the chain portion. By having the pin press fit in the retaining link, the row of links is held in the chain portion.

Two different types of retaining links are also provided in the chain. In one type, the retaining links include downwardly extending toes that hold the upwardly extending portion of the strut. This type of retaining link is used on both outsides of alternate rows of the center chain portion. This type of link is also used in alternate rows of the other two chain portions, but only on the side of the chain portion that is closest to the center chain portion. The second type of retaining link does not include toes for holding the strut. This type of retaining link is used only on alternate rows of the outside chain portions and only on the outermost side of each outside chain portion.

The three portions of the chain are first assembled and then the struts are assembled by inserting the inboard struts into the center chain or second portion of the chain. The outboard struts are positioned relative to the center chain and held in place. The first portion of the chain engages the outboard struts, but clears the inboard struts. The entire assembly is then inverted and the third chain or third chain portion is slipped into place and engages the outboard struts, but clears the inboard struts. The different lengths of struts, if used, are placed at appropriate locations in alternate rows of the chain during this assembly process. The struts differ in length based on their location.

BRIEF DESCRIPTION OF THE DRAWINGS

FIG. 7 is a perspective view of a long outboard strut of the present invention.

FIG. 8 is a perspective view of a short outboard strut of the present invention.

FIG. 9 is a perspective view of a long inboard strut of the present invention.

FIG. 10 is a perspective view of a short inboard strut of the present invention.

FIG. 11 is a side view of an inner retaining link with two depending toes.

FIG. 12 is a side view of an outer retaining link without toes.

FIG. 13 is a schematic illustration of the link aperture with two rocker pins.

FIG. 14 is an exploded view of a portion of the inner link illustrating in detail the two depending toes and passageway.

DETAILED DESCRIPTION OF THE PRESENTLY PREFERRED EMBODIMENTS

Figure 1:
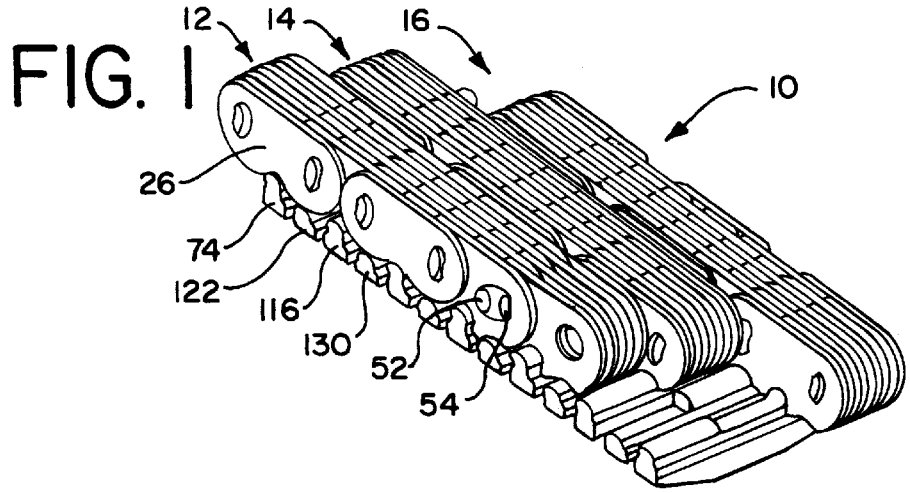
FIG. 1 is a perspective view of a portion of the chain of the present invention.
Figure 2:
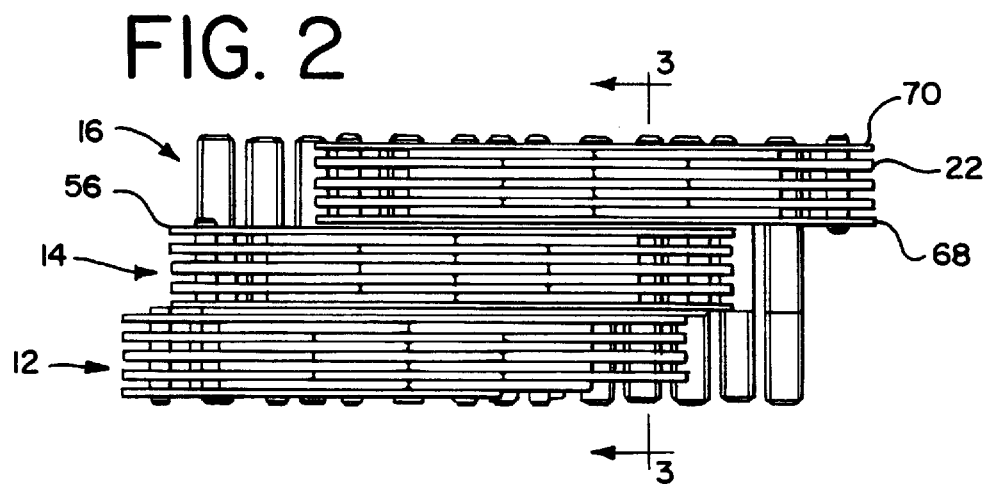
FIG. 2 is a top view of a portion of the chain of the present invention.
Figure 3:
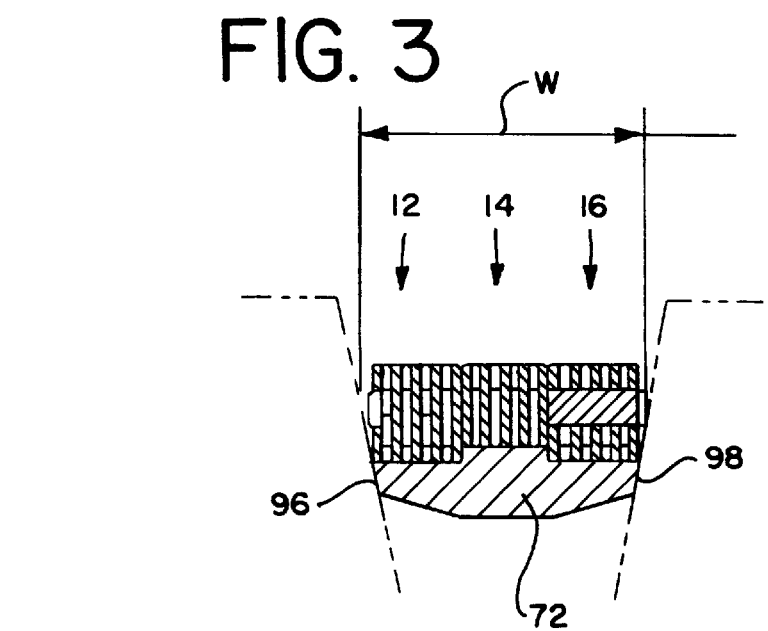
FIG. 3 is a sectional view of the chain taken along line III—III of FIG. 2, illustrating the contact of the pulley faces with the sides of the strut.

Turning now to the drawings, FIG. 1 generally illustrates a portion of a chain 10 of the present invention for use in a variable pulley transmission of the type schematically illustrated in U.S. Pat. No. 5,007,883, which is incorporated herein by reference.

The chain of this invention comprises three chain assemblies or three chain portions 12, 14, 16. The three portions are disposed in side-by-side relationship with the chain portions being offset from one another by one-half pitch. That is, the first chain 12 and second chain 14 portions are offset from each other by one-half pitch and the second 14 and third portions 16 are offset from each other by one-half pitch. The first and third portions are not offset from one another, but are separated by the second portion. Preferably, the first and third portions are outside portions or outboard of the second or central portion in the transverse width of the chain. Of course, other embodiments and configurations are possible within the scope of the present invention.

When assembled, the chain has a transverse width substantially the same as the combined or overall width of the first 12, second 14 and third 16 portions of the chain. Each portion of the chain may have any suitable transverse width. However, the widths must be selected in order to provide the phasing of the three sections and maintain the lacing of the chain.

Figure 5:
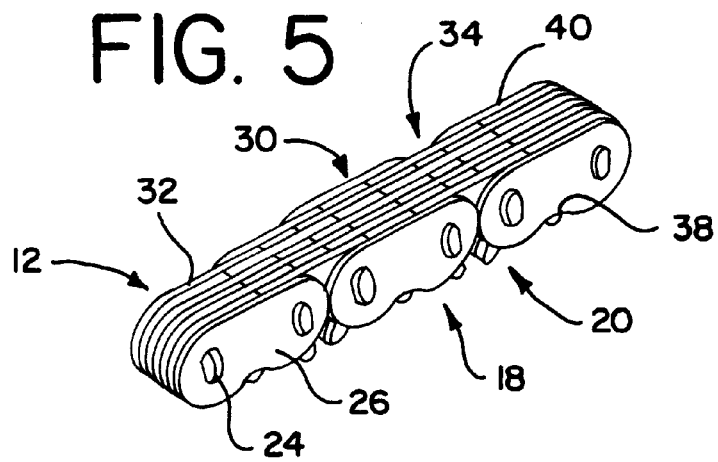
FIG. 5 is a perspective view of one of the outer portions of the chain illustrating the retaining links on the outside.
Figure 6:
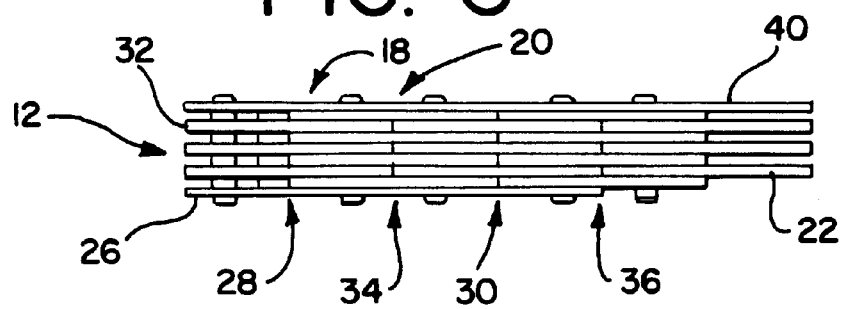
FIG. 6 is a top view of one of the outer portions of the chain of the present invention.
Figure 15:
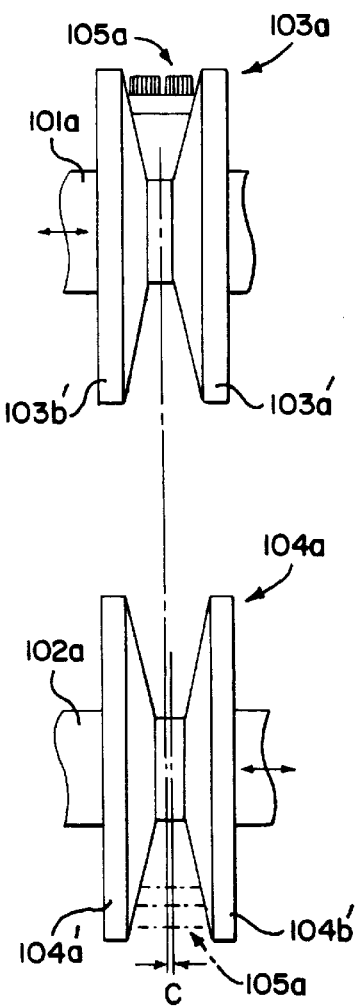
FIG. 15 is a schematic illustration of a pair of variable pulleys of a CVT together with a conventional CVT chain of the prior art.
Figure 16:
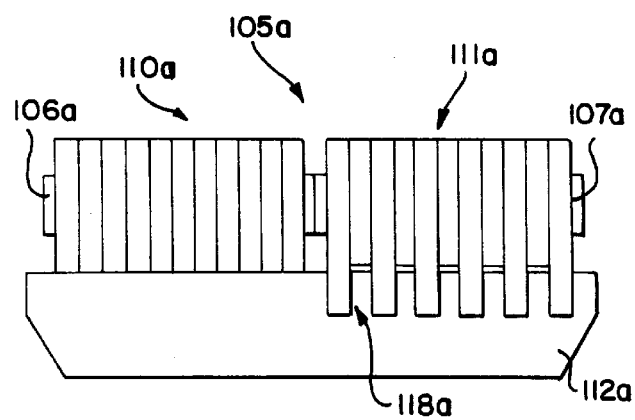
FIG. 16 is a side view of a conventional two-way phased CVT chain belt of the prior art.

The first portion 12 of the chain, shown more clearly in FIGS. 5 and 6, includes a plurality of rows 18, 20 or sets of interleaved links. The inner links 22 are interlaced so that the apertures 24 of one link set are transversely aligned with the apertures of the next adjacent set. In this way, the rows of links articulate with respect to one another.

The first portion 12 of the chain includes retaining links 26 on alternate rows 28, 30 of the chain. In one preferred embodiment, the rows 28 with retaining links include five links across each row. That are, three inner links 32 with a retaining link 26 on each outside. The rows 34, 36 without retaining links include four inner links across the width of the chain. In the first portion 12 of the chain, the retaining links 26 on the outermost part of the chain do not include depending toes. The retaining links 26 without toes are shown in FIG. 12. The toes are removed from these retaining links in order to provide a clearance from the pulley sheave. Instead, the center portion 38 of the link 26 may be supported directly on the top of the strut. The retaining links 40 on the inner part of the first chain portion do include depending toes 42, 44 for holding the top portion, or upwardly extending portion of the strut as shown in FIG. 11.

The inner links 22 include pairs of apertures 46 that permit pairs of pins to extend through each aperture. Such an aperture is shown in FIG. 13. The retaining links 40 include pairs of apertures 48, 50 that permit only a single pin to extend through each aperture. Such an aperture is shown in FIG. 11. The single pin is press fit in the aperture 48, 50 of the retaining link 40 and does not rotate with respect to the retaining link. The pairs of pins 52, 54 in each aperture 46 of the inner links rotate or rock with respect to one another, which permits the articulating motion of the inner links and rows of interleaved inner links. The use of rocker joints and pins in apertures of CVT chains as well as in silent chains is well-known in the art. A pin and rocker joint is shown in U.S. Pat. No. 4,507,106, which is incorporated herein by reference. Pairs of pivot members extend across the length of the first portion 12 of the chain and terminate slightly beyond the ends of the retaining members.

Figure 4:
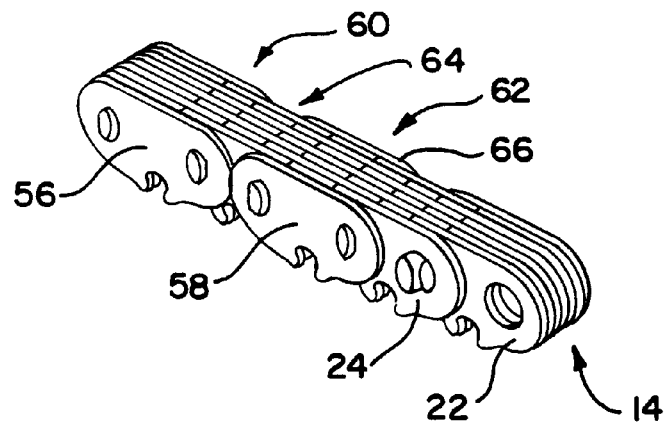
FIG. 4 is a perspective view of the central portion of the chain illustrating the retaining links on the outside and the inner links.

The second portion 14, or central portion, shown in FIG. 4, of the chain is also comprised of a plurality of interleaved inner links 22. The inner links are interlaced so that the apertures of one link set are transversely aligned with the apertures of the next adjacent set. In this way, the rows of links articulate with respect to one another.

The second portion 14 of the chain also includes retaining links 56, 58 on alternate rows of the chain. In one preferred embodiment, the rows 60, 62 with retaining links include five links across each row. That is, three inner links with a retaining link on each outside. The rows 64 without retaining links include four inner links across the width of the chain. In the second portion 14 of the chain, the retaining links 58, 66 on the outermost parts of both sides of the second portion of the chain both include depending toes 42, 44. Thus, the retaining links 56, 66 on the second portion of the chain all hold the top portion, or upwardly extending portion of the strut. As explained below, the top portion of the strut only extends upward in the central portion of the struts that are held by the retaining links and inner links of the central portion of the chain.

The inner links 22 in the second portion 14 of the chain also include pairs of apertures 46 that permit pairs of pins 52, 54 to extend through each aperture. As with the first portion of the chain, the retaining links include pairs of apertures that permit only a single pin to extend through each aperture 48, 50. The single pin is press fit in the aperture of the retaining link and does not rotate with respect to the retaining link. The pairs of pins in each aperture of the inner links rotate or rock with respect to one another, which permits the articulating motion of the inner links and rows of interleaved inner links. The pins extend across only the second portion of the chain.

The third portion 16, or other outside portion, of the chain is also comprised of a plurality of interleaved inner links 22. The third portion is identical to the first portion of the chain. The inner links are interlaced so that the apertures of one link set are transversely aligned with the apertures of the next adjacent set. In this way, the rows of links articulate with respect to one another.

The third portion 16 of the chain also includes retaining links 68, 70 on alternate rows of the chain. In one preferred embodiment, the rows with retaining links include five links across each row. That is, three inner links with a retaining link on each outside. The rows without retaining links include four inner links across the width of the chain. In the third portion of the chain, the retaining links 70 on the outermost part of the chain do not include depending toes. The retaining links on the innermost part of the third portion of the chain do include depending toes, which hold the top portion, or upwardly extending portion of the strut. The inner links in the third portion of the chain act in a similar manner to the inner links in the other two portions of the chain. The links also include pivot members and rocker joints, in the same manner as the first and second portions of the chain. The pins extend only across the third portion of the chain.

A load block or strut 72 is associated with each row of links to engage the flanges of the pulleys. The struts 72 are a solid metal block that provide the means of power transmission from the pulleys to the chain and back to the pulleys.

Referring to FIG. 7, a long outboard strut 74 for use with the chain is shown. While four types of struts are shown for the preferred embodiment, many characteristics of the four struts are the same. The primary differences are in the length of the struts (long or short) and whether the struts are used as inboard or outboard struts. Inboard refers to the upwardly extending or top portion of the strut being located only along the central portion of the strut to be held by the depending toes of the links in the second or central portion of the chain. Outboard refers to the upwardly extending or top portion of the strut being located in two positions along the outsides of the strut in the transverse direction of the strut, which permit the strut to be held by the depending toes of the links in the first and third portions, or outside portions, of the chain. The struts are held in the passageways formed between the depending toes of the links. The struts are retained in position by the other portions of the chain.

In one preferred embodiment, each strut 74 is symmetrical about a vertical centerline in both the end direction 76 and in the lengthwise 78 (or transverse) directions. The strut 74 includes a top 80, two rounded link contacting surfaces 82, 84, two grooves 86, 88, a first side 90, a second side 92, a bottom 94 and ends 96, 98 that contact the flanges of the pulley surfaces. The upper region of the strut, including the top and the rounded contacting surface, is similar in shape to the passageway 100 and is only slightly smaller in size to allow the struts to be positioned in the passageway.

A groove 86, 88 is provided between the rounded contacting surface 82, 84 and each substantially vertical side 90, 92. The groove is shaped to complement the projections on the inner flanks 102, 104 of the toes 106, 108 so that the strut can be slidably received and retained within the passageway 100 of the link. In addition, when the strut is received in the passageway, relative vertical movement of the strut from the links is prevented as a result of the complementary engagement of the strut in the passageway.

Returning to the strut shown in FIG. 7, this long outboard strut 74 includes two top 110, 112 or upwardly extending portions along the portions of the strut at which the depending toes of the links of the first and third portions of the chain will form a corresponding passageway to receive the strut. A flat portion 114 is located between the top portions.

Referring to FIG. 8, a short outboard strut 116 is shown. The short outboard strut 116 includes upwardly extending or top portions 118, 120 in the same outboard locations as the long outboard strut. The difference between the long and short outboard struts is the total length of the strut in the transverse distance, that is, in the distance across the width "W" of the chain.

As explained above, the first and third portions of the chain will have retaining links located on alternate rows of each portion of the chain. Rows with retaining links will have one additional link compared to rows without retaining links. The long outboard strut is therefore of a sufficient length to provide a modification or randomization of the repetitive contacts of the long and short struts with the pulley sheaves.

Referring to FIG. 9, a long inboard strut 122 is shown. The inboard strut includes an upwardly extending or top portion 124 only in the central portion of the strut. The upwardly extending portion 124 is located at the central portion of the strut which corresponds to the location at which the links with depending toes in the central portion of the chain will form a passageway to receive the top portion of the strut. The inboard strut has flat portions 126, 128 adjacent the top portion 124. The upper portion or top portion 124 includes the two rounded link contacting surfaces, 82, 84 along with grooves 86, 88.

Referring to FIG. 10, a short inboard strut 130 is shown. Referring to FIGS. 11 and 12, side views of an inner retaining link 40 and an outer retaining link 26 are illustrated. The inner link 40 is generally symmetrical about a vertical centerline. The inner retaining link comprises a top 130, preferably substantially horizontal, and a bottom having two spaced apart depending toes 42, 44 that define a passageway for the upper portion 80 or top portion of the strut. The inner link includes a pair of apertures 48, 50 to receive a pivot member or pin. The depending toes preferably have inner flanks 102, 104 that are shaped to hold the top portion of the strut. The passageway is shown in detail in FIG. 14.

The inner links 22 are similar to the inner retaining links 40 in that the inner links include a pair of depending toes that define a passageway for the top of the strut. The pair of apertures 46 of the inner links, however, are shaped to hold a pair of pivot members 52, 54, one of which rotates with respect to the link.

The outer retaining links 26 are similar to the inner retaining links in that their apertures 132, 134 are shaped to hold only a single pivot member that is press fit or tightly fit in the aperture. However, the outer retaining links do not include any depending toes. The central portion 136 of the outer retaining link 26 is shaped to be spaced from the top surface of the top portion of the strut.

As noted above, the first portion 12 of the chain will have outer retaining links 26 on the outermost portion of the chain and inner retaining links 40 on the inner portion of the chain. The second portion 14 of the chain will have inner retaining links 40 on both sides of the second portion of the chain. The third portion 16 of the chain will have outer retaining links 26 on the outermost portion of the chain and inner retaining links 40 on the inner portion of the third portion of the chain.

In order to assemble the chain, each portion of the chain is assembled with inner links and retaining links in the positions described and shown in the drawings. Each portion of the chain includes pins that extend across only the width of that portion of the chain. In effect, each portion of the chain comprises a separate chain or chain assembly of link plates.

The second or center portion of the chain is then assembled onto the long and short inboard struts. The long and short struts may also be positioned in a predetermined pattern. The toes, or passageway, of the rows of links having retaining links will be fit onto the top portion of the inboard struts. The outboard struts are then positioned relative to the center portion of the chain and are held in place by a fixture. The first chain or first chain portion is then slipped into place, engaging the outboard struts, but clearing the inboard struts. The entire assembly is then inverted and the third chain or third chain portion is then slipped in place, engaging the outboard struts, but clearing the inboard struts.

In order to provide the phasing or offset, the second portion of the chain is spaced one-half pitch length from the first and third chain portions. Long and short inboard struts, and long and short outboard struts, may be positioned in a predetermined random pattern in order to avoid or minimize sharp tones or resonant tones at the frequency of a repeated engagement. Thus, in a preferred lacing pattern the first row of links of the second portion of the chain, which will have retaining links, will have the passageway formed by the depending toes of the links fit onto the top portion of an inboard strut. The next row of links, which will not have retaining links, will have the passageway of the depending links fit onto the top portion of an inboard strut. The subsequent row of links, which will have retaining links, is then fit onto an inboard strut. This pattern is continued around the second portion of the chain.

When the portions of the chain are assembled or fit together in side-by-side relationship, the inboard struts will be placed in the space between the outboard struts and the first and second portion of the chain will be offset by one-half pitch distance. As shown in FIG. 1, links of the first portion of the chain will be retained by the alternating inboard struts of the second chain portion. Similarly, the links of the second portion of the chain will be retained by the alternating outboard struts of the first portion and third portion of the chain.

The passageways of the depending toes of the links of the third portion of the chain are also assembled onto the top portions of the outboard struts. As with the first portion of the chain, the rows of links with retaining links will be fit onto the outboard struts and the rows of links without retaining links will be fit onto the alternate outboard struts. In this manner, the third portion of the chain will be offset by one-half pitch from the second portion of the chain and aligned with the first portion of the chain.

Although the present invention has been described as having three chain portions to form a single full width chain, the principles of the invention may be used to provide a full width chain with more than three chain portions.

Those skilled in the art to which the invention pertains may make other modifications and embodiments employing the principles of this invention without departing from its spirit or essential characteristics, particularly upon considering the foregoing teachings. The described embodiments are to be considered in all respects as only illustrative and not restrictive.

What is claimed is:

1. A power transmission chain comprising:
   a first chain portion having a first plurality of interlaced rows of links with each row having a first plurality of transversely arranged links, first pivot members joining said first plurality of interlaced rows of links to form a first chain assembly, said first rows of links including first inner links, said first inner links each having a first pair of apertures for receiving said first pivot members and a first pair of toes extending downward from each link to define a first passageway, alternate rows of said first rows of links including first retaining links on the outer ends of said first rows of links, said first retaining links having a first pair of retaining link apertures for receiving said first pivot members, said first pivot members being press fit within said first pair of retaining link apertures, a plurality of outboard struts, said outboard struts having first top portions positioned in said first passageways of said first chain portion;

a second chain portion having a second plurality of interlaced rows of links with each row having a second plurality of transversely arranged links, second pivot members joining said second plurality of interlaced rows of links to form a second chain assembly, said second rows of links including second inner links, said second inner links each having a second pair of apertures for receiving said second pivot members and a pair of toes extending downward from each link to define a second passageway, alternate rows of said second rows of links including second retaining links on the outer ends of said second rows of links, said second retaining links having a second pair of retaining link apertures for receiving said second pivot members, said second pivot members being press fit within said second apertures of said second retaining links, a plurality of inboard struts, said inboard struts having central top portions located in a central portion of said inboard struts, said central top portions having two flat portions flanking said central top portion, said central top portions of said inboard struts positioned in said second passageways of said second chain portion;

a third chain portion having a third plurality of interlaced rows of links with each row having a third plurality of transversely arranged links, third pivot members joining said third plurality of interlaced rows of links to form a third chain assembly, said third rows of links including third inner links, said third inner links each having a third pair of apertures for receiving said third pivot members and a third pair of toes extending downward from each link to define a third passageway, alternate rows of said third rows of links including third retaining links on the outer ends of said third rows of links, said third retaining links having a third pair of retaining link apertures for receiving said third pivot members, said third pivot members being press fit within said third retaining link apertures; and said first chain portion and said second chain portion being placed in side-by-side relation and offset by approximately one-half pitch length of said chain, said outboard struts being interleaved with said inboard struts, said second chain portion and said third chain portion being placed in side-by-side relation and offset by one-half pitch length of said chain, said outboard struts having second top portions positioned in said third passageway of said third chain portion, said second top portions of said outboard struts being spaced apart from said first top portions of said outboard struts, said outboard struts having a central flat portion located between said first and second top portions, said second chain portion being positioned between said first top portions and said second top portions of said outboard struts above said central flat portion.

2. The power transmission chain of claim 1 including a plurality of long outboard struts and a plurality of short outboard struts, said long outboard struts being of greater length in the longitudinal direction than said short outboard struts.

3. The power transmission chain of claim 2 wherein said outboard struts include first and second top portions positioned within said first and third passageways of said first and third retaining links.

4. The power transmission chain of claim 2 wherein said long outboard struts are placed with said short outboard struts in a predetermined pattern along said chain.

5. The power transmission chain of claim 2 wherein said inboard struts have central top portions positioned within said second passageways of said second retaining links.

6. The power transmission chain of claim 5 wherein said long inboard struts are positioned with said short inboard struts in a predetermined pattern along said second chain portion.

* * * * *

UNITED STATES PATENT AND TRADEMARK OFFICE
CERTIFICATE OF CORRECTION

PATENT NO. : 6,123,638
DATED : September 26, 2000
INVENTOR(S) : Roger P. Butterfield It is certified that error appears in the above-identified patent and that said Letters Patent is hereby corrected as shown below:

Column 10,
Line 42, change "5" to -- 2 --

Signed and Sealed this

Twenty-fourth Day of September, 2002

Attest:

JAMES E. ROGAN
Attesting Officer
Director of the United States Patent and Trademark Office